US010768499B2

(12) United States Patent
Yu et al.

(10) Patent No.: US 10,768,499 B2
(45) Date of Patent: Sep. 8, 2020

(54) DISPLAY DEVICE, OPERATING METHOD OF DISPLAY DEVICE, AND PIXEL CIRCUIT OF DISPLAY DEVICE

(71) Applicant: AU Optronics Corporation, Hsin-Chu (TW)

(72) Inventors: Fang-Cheng Yu, Hsin-Chu (TW); Tzu-Yi Tsao, Hsin-Chu (TW); Pu-Jung Huang, Hsin-Chu (TW); Cheng-Yeh Tsai, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/567,380

(22) Filed: Sep. 11, 2019

(65) Prior Publication Data
US 2020/0004059 A1    Jan. 2, 2020

Related U.S. Application Data

(62) Division of application No. 15/280,033, filed on Sep. 29, 2016.

(30) Foreign Application Priority Data

Mar. 8, 2016 (TW) .............................. 105107066 A

(51) Int. Cl.
G02F 1/137      (2006.01)
G02F 1/133      (2006.01)
G02F 1/1343     (2006.01)
G02F 1/13357    (2006.01)
G02F 1/1362     (2006.01)
G02F 1/1335     (2006.01)

(52) U.S. Cl.
CPC ........ *G02F 1/137* (2013.01); *G02F 1/133621* (2013.01); *G02F 1/134309* (2013.01); *G02F 1/134363* (2013.01); *G02F 1/136286* (2013.01); *G02F 1/133514* (2013.01); *G02F 2001/133622* (2013.01); *G02F 2201/121* (2013.01); *G02F 2203/04* (2013.01)

(58) Field of Classification Search
None
See application file for complete search history.

(56) References Cited

U.S. PATENT DOCUMENTS

| 9,958,740 B2* | 5/2018 | Tang ..................... G02F 1/1343 |
| 2005/0179847 A1* | 8/2005 | Miyachi et al. ....... G02F 1/1343 |
| 2007/0247833 A1* | 10/2007 | Lee et al. ................ G09F 13/04 |
| 2012/0182512 A1* | 7/2012 | Sakurai et al. ........ G02F 1/1343 |
| 2012/0327346 A1* | 12/2012 | Tsai et al. ............. G02F 1/1333 |
| 2017/0192261 A1* | 7/2017 | Tang ........................ G02F 1/137 |

* cited by examiner

Primary Examiner — Edward J Glick
Assistant Examiner — Anthony G Quash
(74) Attorney, Agent, or Firm — WPAT, PC

(57) ABSTRACT

A display device includes a first substrate, a second substrate, a first liquid crystal display medium, and a first electric field applying component. The first electric field applying component is configured to apply a first electric field to a first portion of the first liquid crystal display medium and apply a second electric field to a second portion of the first liquid crystal display medium. The intensity of the first electrical field is operatively different from that of the second electrical field.

5 Claims, 11 Drawing Sheets

DISPLAY DEVICE, OPERATING METHOD OF DISPLAY DEVICE, AND PIXEL CIRCUIT OF DISPLAY DEVICE

TECHNICAL FIELD

The present disclosure relates to a device, a method, and a circuit. In particular, the present disclosure relates to a display device, an operating method of a display device, and a pixel circuit of a display device.

BACKGROUND ART

With the development of science and technology, display devices have been widely used in people's lives.

Typically, a liquid crystal display device is provided with liquid crystal units and two polarizers vertical to each other. The liquid crystal display device may apply a bias to the liquid crystal units, to enable light to selectively pass through the polarizers through the effect of the liquid crystal units, for displaying. However, different liquid crystal materials have different properties. Therefore, how to make use of a variety of liquid crystal materials for controlling light to pass through the polarizers is an important issue in the art.

SUMMARY OF THE INVENTION

One aspect of the present disclosure relates to a display device. According to one embodiment of the present disclosure, a display device includes: a first substrate, a second substrate, a first liquid crystal display medium, and a first electric field applying component. The first liquid crystal display medium is disposed between the first substrate and the second substrate. The first electric field applying component is disposed on the second substrate and is configured to apply a first electric field to a first portion of the first liquid crystal display medium, and to apply a second electric field to a second portion of the first liquid crystal display medium, wherein the first electric field and the second electric field are parallel to the first substrate, and the intensity of the first electric field is operatively different from that of the second electric field.

Another aspect of the present disclosure relates to an operating method of a display device. According to one embodiment of the present disclosure, the operating method of a display device includes: applying a first electric field to a first portion of a first liquid crystal display medium, wherein the first liquid crystal display medium is disposed between a first substrate and a second substrate; and applying a second electric field to a second portion of the first liquid crystal display medium. The first electric field and the second electric field are parallel to the first substrate, and the intensity of the first electric field is operatively different from that of the second electric field.

Another aspect of the present disclosure relates to a pixel circuit of a display device. According to one embodiment of the present disclosure, the pixel circuit includes a first liquid crystal component, a second liquid crystal component, a first storage capacitor, a second storage capacitor, a first switch, and a second switch. The first liquid crystal component is coupled between a first end of a first capacitor and a common electrode. The second liquid crystal component is coupled between a second end of the first capacitor and the common electrode. The first storage capacitor is coupled in parallel to the first liquid crystal component. The second storage capacitor is coupled in parallel to the second liquid crystal component. The first switch is coupled between the first storage capacitor and a first data line, for providing a first data voltage to the first storage capacitor. The second switch is coupled between the second storage capacitor and a second data line, for providing a second data voltage to the second storage capacitor.

Another aspect of the present disclosure relates to a pixel circuit of a display device. According to one embodiment of the present disclosure, the pixel circuit includes a first liquid crystal component, a second liquid crystal component, a first storage capacitor, a second storage capacitor, a first switch, a second switch, and a third switch. The first liquid crystal component is coupled between a first end of a first capacitor and a first end of a second capacitor. The second liquid crystal component is coupled between a second end of the first capacitor and a second end of the second capacitor. The first storage capacitor is coupled in parallel to the first liquid crystal component. The second storage capacitor is coupled in parallel to the second liquid crystal component. The first switch is coupled between the first storage capacitor and a first data line, for providing a first data voltage to the first storage capacitor. The second switch is coupled between a first end of the second storage capacitor and a second data line, for providing a second data voltage to the first end of the second storage capacitor. The third switch is coupled between a second end of the second storage capacitor and a third data line, for providing a third data voltage to the second end of the second storage capacitor.

Another aspect of the present disclosure relates to a pixel circuit of a display device. According to one embodiment of the present disclosure, the pixel circuit includes a first liquid crystal component, a second liquid crystal component, a first storage capacitor, a second storage capacitor, a first switch, and a second switch. The first liquid crystal component has a first end and a second end, wherein the first end of the first liquid crystal component is coupled to a first end of a first capacitor. The second liquid crystal component has a first end and a second end, wherein the first end of the second liquid crystal component is coupled to a second end of the first capacitor, and the second end of the second liquid crystal component is coupled to the second end of the first liquid crystal component. The first storage capacitor is coupled in parallel to the first liquid crystal component. The second storage capacitor is coupled in parallel to the second liquid crystal component. The first switch is coupled between the second end of the first liquid crystal component and a first data line, for providing a first data voltage to the second end of the first liquid crystal component. The second switch is coupled between the first end of the first liquid crystal component and a second data line, for providing a second data voltage to the first end of the first liquid crystal component.

Through the application of one of the above embodiments, electric fields of different intensities can be applied to different portions of the liquid crystal display medium. In this way, the liquid crystal display medium can allow more refined operations thereof.

BRIEF DESCRIPTIONS OF THE DRAWINGS

DETAILED DESCRIPTIONS OF THE INVENTION

The spirit of the present disclosure is illustrated clearly below with reference to drawings and detailed description, persons having ordinary skill in the art, after understanding exemplary embodiments of the present disclosure, may make changes and modifications through techniques taught in the present disclosure, without departing from the spirit and scope of the present disclosure.

The terms "first", "second" and the like used herein do not denote any particular order or sequence, and these terms are not intended to limit the present disclosure, and are used only for distinguishing between elements or operations described with same technical terms.

The term "electrically coupled" used herein may mean that two or more elements are in a direct physical or electrical contact or in an indirect physical or electrical contact, and the term "electrically coupled" may also mean that two or more elements co-operate or interact.

As used herein, the terms "comprising," "including," "having," "containing," and the like are to be understood to be open-ended, i.e., to mean including but not limited to.

As used herein, the term "and/or" includes any and all combinations of one or more of the associated listed items.

As used herein, words indicating direction, such as "above," "below," "left," "right," "front" and "back," are directions as they relate to the accompanying drawings. Therefore, such words indicating direction are used for illustration and are not intended to limit the present disclosure.

The meanings of every term used herein refer to a usual meaning of the term known to one skilled in the art, unless otherwise indicated. Some terms used to describe the present disclosure will be discussed elsewhere in the specification, so as to provide an additional guide to the description of the present disclosure for persons skilled in the art.

Figure 1:
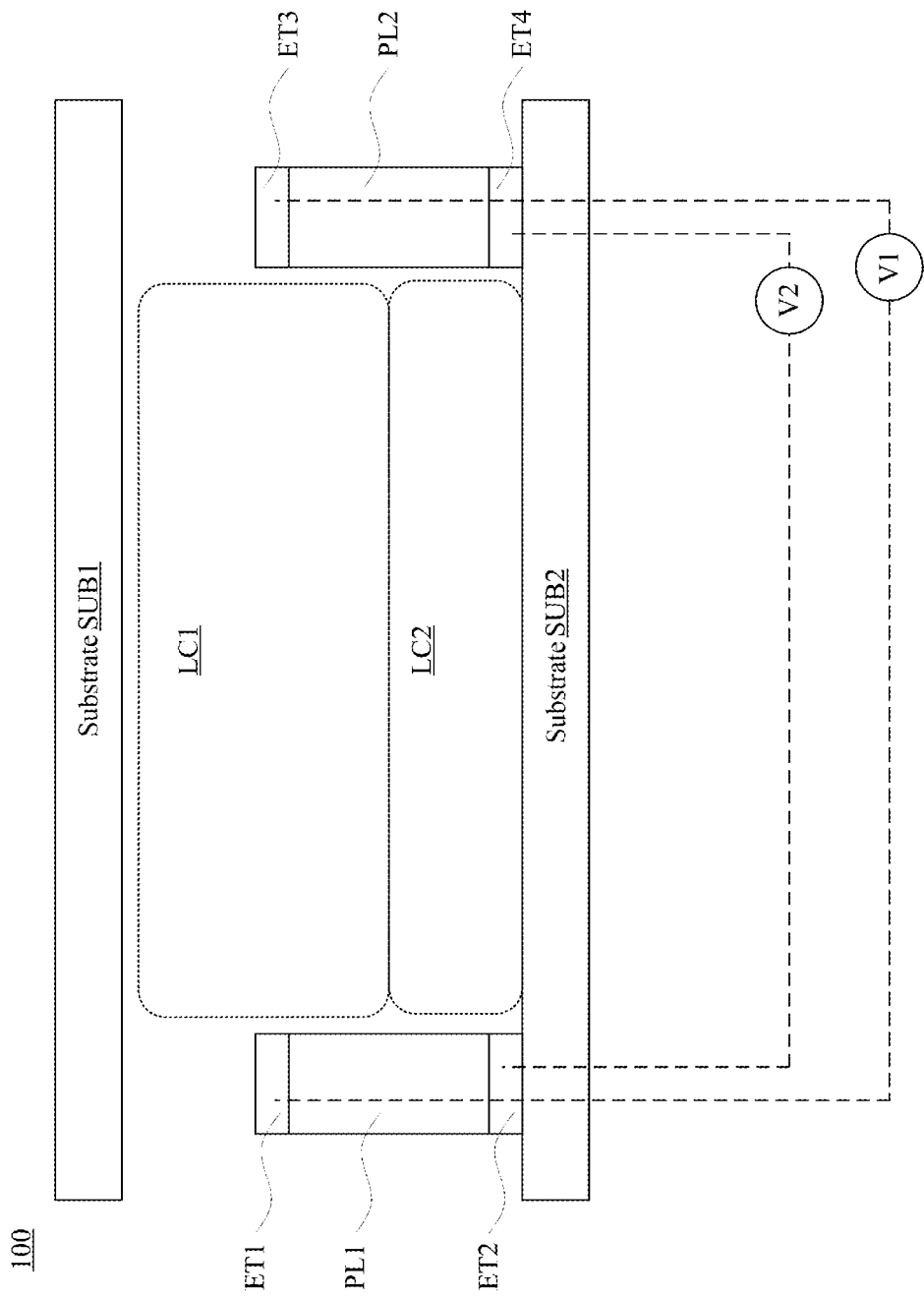
FIG. 1 is a schematic view of a display device according to one embodiment of the present disclosure.

FIG. 1 is a schematic view of a display device 100 according to one embodiment of the present disclosure. In the present embodiment, the display device 100 includes a first substrate SUB1, a second substrate SUB2, a liquid crystal display medium LC1, LC2, and an electric field applying component ET1-ET4, PL1, PL2.

In the present embodiment, the liquid crystal display medium LC1, LC2 is disposed between the first substrate SUB1 and the second substrate SUB2. In one embodiment, the liquid crystal display medium LC1, LC2 may be implemented by blue-phase liquid crystal. In the present embodiment, the electric field applying component ET1-ET4, PL1, PL2 is disposed on the second substrate SUB2. In one embodiment, the electric field applying component ET1-ET4, PL1, PL2 includes electrodes ET1-ET4 and electrode posts PL1 and PL2. The electrode posts PL1 and PL2 are respectively disposed at two opposite sides of the liquid crystal display medium LC1, LC2. In one embodiment, the electrodes ET1 and ET2 are respectively disposed at two opposite ends of the electrode post PL1, and the electrodes ET3 and ET4 are respectively disposed at two opposite ends of the electrode post PL2.

In the present embodiment, the electric field applying component ET1-ET4, PL1, PL2 is configured to apply a first electric field to a first portion LC1 of the liquid crystal display medium and to apply a second electric field to a second portion LC2 of the liquid crystal display medium. In one embodiment, the display device 100 may provide a first voltage difference V1 between the electrode ET1 and the electrode ET3, to apply the first electric field to the first portion LC1 of the liquid crystal display medium. In one embodiment, the display device 100 may provide a second voltage difference V2 between the electrode ET2 and the electrode ET4, to apply the second electric field to the second portion LC2 of the liquid crystal display medium.

In the present embodiment, the first electric field and the second electric field are both generally parallel to the first substrate SUB1 and the second substrate SUB2. In the present embodiment, the intensity of the first electric field is operatively the same as or different from that of the second electric field, i.e., the first voltage difference V1 is operatively the same as or different from the second voltage difference V2. It should be noted that, although the two electric fields are taken as an example herein, other numbers of electric fields also fall within the scope of the present disclosure.

Through the above configuration, different portions of the liquid crystal display medium LC1, LC2 can allow more refined operations thereof, improving the displaying quality of the display device 100.

Figure 2A:
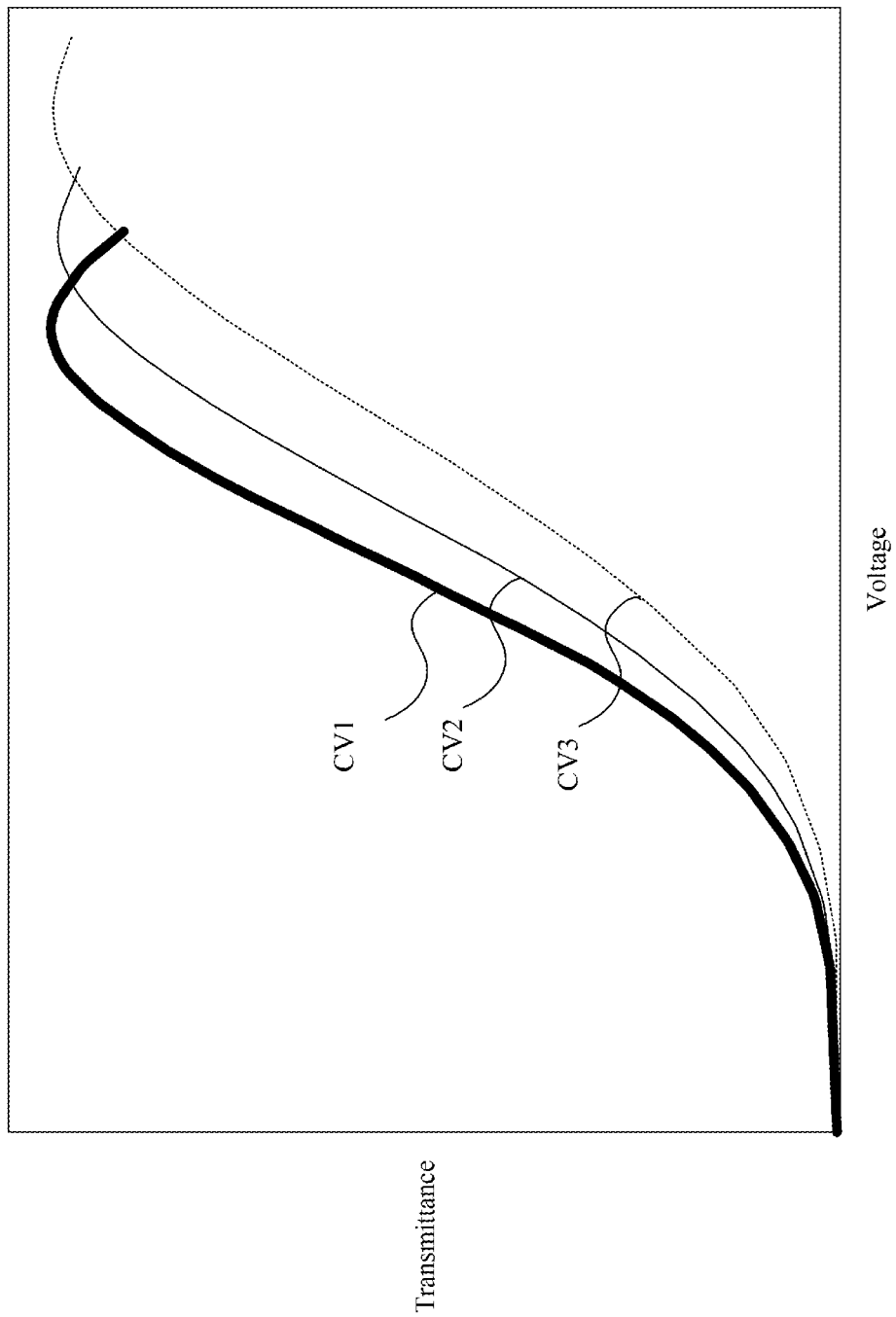
FIG. 2A is a schematic view of a light transmittance according to one comparative example of the present disclosure.

For example, referring to FIG. 2A, in one comparative example of the present disclosure, lights of different colors (that is, different wavelengths) have different transmittances with respect to the same liquid crystal display medium under the same voltage, wherein a curve CV1 for example represents a blue light, a curve CV2 for example represents a green light, and a curve CV3 for example represents a red light. In this way, the complexity in controlling the light to pass through the liquid crystal display medium is increased, and a color shift may be generated under a high voltage.

Figure 2B:
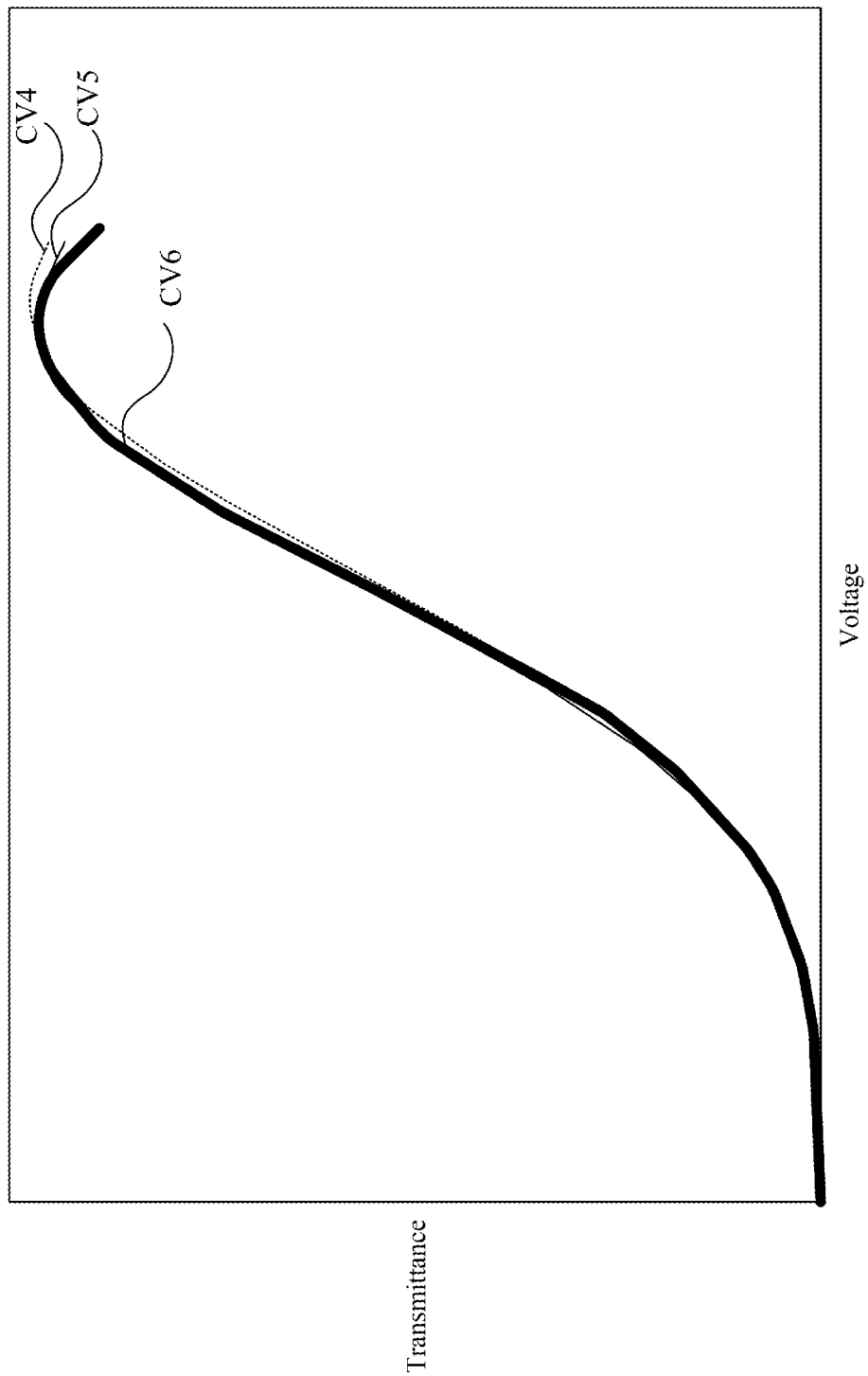
FIG. 2B is a schematic view of a light transmittance according to one comparative example of the present disclosure.

In contrast, referring to FIG. 2B, in one embodiment of the present disclosure, by means of the different intensities of the first electric field and the second electric field, the lights of different colors (different wavelengths) are made to have generally the same transmittance with respect to the same liquid crystal display medium, wherein a curve CV4 for example represents a blue light transmittance when an intensity ratio of the first electric field to the second electric field is 36/28, a curve CV5 for example represents a green light transmittance when the intensity ratio of the first electric field to the second electric field is 36/36, and a curve CV6 for example represents a red light transmittance when the intensity ratio of the first electric field to the second electric field is 36/42. In this way, the complexity in controlling the light to pass through the liquid crystal display medium may be decreased, and the generation of the color shift under a high voltage may be avoided.

Hereinafter, details of one embodiment of the present disclosure are illustrated in connection with FIG. 3, but the present disclosure is not limited thereto.

In one embodiment, a display device 100A, in addition to the aforementioned components of the display device 100, further includes a first backlight source BL1, a second backlight source BL2, and a third backlight source BL3. In one embodiment, the first backlight source BL1 is a blue backlight source, the second backlight source BL2 is a green backlight source, and the third backlight source BL3 is a red backlight source. It should be noted that, the number and form of the aforementioned backlight sources are exemplary only, and other numbers and forms of the backlight sources also fall within the scope of the present disclosure.

In one embodiment, the first backlight source BL1, the second backlight source BL2, and the third backlight source BL3 are configured to provide lights of different colors to the liquid crystal display medium LC1, LC2 respectively. The display device 100 is configured to generate the aforementioned first electric field and second electric field through the electric field applying component, for controlling the light transmittance of the liquid crystal display medium LC1, LC2.

In one embodiment, in different sub-frames of a frame, different backlight sources provide lights of different colors to the liquid crystal display medium LC1, LC2, and the electric field applying component ET1-ET4, PL1, PL2 generate the first electric field and the second electric field that are the same as or different from each other.

For example, in a frame including a first sub-frame, a second sub-frame, and a third sub-frame, gray scale data of the blue light, the green light, and the red light are 128, 128, and 128 respectively.

In a first sub-frame, the first backlight source BL1 is configured to provide the blue light to the liquid crystal display medium LC1, LC2. The second backlight source BL2 and the third backlight source BL3 are nonluminous. At this point, the first electric field and the second electric field provided by the electric field applying component ET1-ET4, PL1, PL2 have different electric field intensities. In one embodiment, the intensity ratio of the first electric field to the second electric field is 36:28. In one embodiment, the electric field applying component ET1-ET4, PL1, PL2 may for example enable the electrode ET1 and the electrode ET3 to have a voltage difference of 3.6 V, and enable the electrode ET2 and the electrode ET4 to have a voltage difference of 2.8 V.

In a subsequent second sub-frame following the first sub-frame, the second backlight source BL2 is configured to provide the green light to the liquid crystal display medium LC1, LC2. The first backlight source BL1 and the third backlight source BL3 are nonluminous. At this point, the first electric field and the second electric field provided by the electric field applying component ET1-ET4, PL1, PL2 have a same intensity. In one embodiment, the electric field applying component ET1-ET4, PL1, PL2 may for example enable the electrode ET1 and the electrode ET3 to have a voltage difference of 3.6 V, and enable the electrode ET2 and the electrode ET4 to also have a voltage difference of 3.6 V.

In a subsequent third sub-frame following the second sub-frame, the third backlight source BL3 is configured to provide the red light to the liquid crystal display medium LC1, LC2. The first backlight source BL1 and the second backlight source BL2 are nonluminous. At this point, the first electric field and the second electric field provided by the electric field applying component ET1-ET4, PL1, PL2 have different intensities. In one embodiment, the intensity ratio of the first electric field to the second electric field is 36:42. In one embodiment, the electric field applying component ET1-ET4, PL1, PL2 may for example enable the electrode ET1 and the electrode ET3 to have a voltage difference of 3.6 V, and enable the electrode ET2 and the electrode ET4 to have a voltage difference of 4.2 V.

Through the aforementioned operations, voltage/transmittance curves (also referred to as gamma curves) of the blue light, the green light, and the red light are generally superposed with each other (referring to FIG. 2B). In this way, the complexity in controlling the light to pass through the liquid crystal display medium may be decreased, and the generation of the color shift under a high voltage may be avoided.

It should be noted that, in one embodiment, the intensity ratio of the first electric field to the second electric field in the second sub-frame may be between the intensity ratio of the first electric field to the second electric field in the first sub-frame and the intensity ratio of the first electric field to the second electric field in the third sub-frame. In one embodiment, the intensities of the first electric field and second electric field in the second sub-frame may be different from each another, and thus the present disclosure is not limited to the embodiment where the intensities of the first electric field and the second electric field in the second sub-frame are the same as each another.

Hereinafter, details of one embodiment of the present disclosure are illustrated in connection with FIG. 4, but the present disclosure is not limited thereto.

In one embodiment, the display device 100B includes a first substrate SUB1, a second substrate SUB2, a first liquid crystal display medium LC11, LC12, a second liquid crystal display medium LC21, LC22, a third liquid crystal display medium LC31, LC32, a first electric field applying component ET11-ET14, PL11, PL12, a second electric field applying component ET21-ET24, PL21, PL22, a third electric field applying component ET31-ET34, PL31, PL32, a first color filter CF1, a second color filter CF2, a third color filter CF3, and a backlight source BL. In one embodiment, the first color filter CF1 is for example a blue filter, the second color filter CF2 is for example a green filter, and the third color filter CF3 is for example a red filter.

In one embodiment, the first liquid crystal display medium LC11, LC12, the first electric field applying component ET11-ET14, PL11, PL12, and the first color filter CF1 may be defined as a first sub-pixel PX1, the second liquid crystal display medium LC21, LC22, the second electric field applying component ET21-ET24, PL21, PL22, and the second color filter CF2 may be defined as a second sub-pixel PX2, and the third liquid crystal display medium LC31, LC32, the third electric field applying component ET31-ET34, PL31, PL32, and the third color filter CF3 may be defined as a third sub-pixel PX3.

In one embodiment, the backlight source BL is configured to provide a white light to the first liquid crystal display medium LC11, LC12, the second liquid crystal display medium LC21, LC22, and the third liquid crystal display medium LC31, LC32. The white light operatively passes through the first liquid crystal display medium LC11, LC12, the second liquid crystal display medium LC21, LC22, and the third liquid crystal display medium LC31, LC32, and is filtered by the first color filter CF1, the second color filter CF2, and the third color filter CF3 respectively into lights of different colors.

In one embodiment, the first electric field applying component ET11-ET14, PL11, PL12, the second electric field applying component ET21-ET24, PL21, PL22, and the third electric field applying component ET31-ET34, PL31, PL32 are disposed on the second substrate SUB2.

In one embodiment, the first electric field applying component ET11-ET14, PL11, PL12 includes electrodes ET11-ET14 and electrode posts PL11 and PL12. The electrode posts PL11 and PL12 are respectively disposed at two opposite sides of the liquid crystal display medium LC11, LC12. In one embodiment, the electrodes ET11 and ET12 are respectively disposed at two opposite ends of the electrode post PL11, and the electrodes ET13 and ET14 are respectively disposed at two opposite ends of the electrode post PL12.

In one embodiment, the second electric field applying component ET21-ET24, PL21, PL22 includes electrodes ET21-ET24 and electrode posts PL21 and PL22. The electrode posts PL21 and PL22 are respectively disposed at two opposite sides of the liquid crystal display medium LC21, LC22. In one embodiment, the electrodes ET21 and ET22 are respectively disposed at two opposite ends of the electrode post PL21, and the electrodes ET23 and ET24 are respectively disposed at two opposite ends of the electrode post PL22.

In one embodiment, the third electric field applying component ET31-ET34, PL31, PL32 includes electrodes ET31-ET34 and electrode posts PL31 and PL32. The electrode posts PL31 and PL32 are respectively disposed at two opposite sides of the liquid crystal display medium LC31, LC32. In one embodiment, the electrode ET31 and ET32 are respectively disposed at two opposite ends of the electrode post PL31, and the electrodes ET33 and ET34 are respectively disposed at two opposite ends of the electrode post PL32.

In one embodiment, a first voltage difference is provided between the electrode ET11 and the electrode ET13, for applying a first electric field to the liquid crystal display medium LC11, a second voltage difference is provided between the electrode ET12 and the electrode ET14, for applying a second electric field to the liquid crystal display medium LC12, a third voltage difference is provided between the electrode ET21 and the electrode ET23, for applying a third electric field to the liquid crystal display medium LC21, a fourth voltage difference is provided between the electrode ET22 and the electrode ET24, for applying a fourth electric field to the liquid crystal display medium LC22, a fifth voltage difference is provided between the electrode ET31 and the electrode ET33, for applying a fifth electric field to a liquid crystal display medium LC31, and a sixth voltage difference is provided between the electrode ET32 and the electrode ET34, for applying a sixth electric field to the liquid crystal display medium LC32.

In the present embodiment, the first electric field to the sixth electric field are all generally parallel to the first substrate SUB1 and the second substrate SUB2. In the present embodiment, the intensity of the first electric field is operatively different from that of the second electric field, and the first voltage difference is operatively different from the second voltage difference. The intensity of the third electric field is operatively different from that of the fourth electric field, and the third voltage difference is operatively different from the fourth voltage difference. The intensity of the fifth electric field is operatively different from that of the sixth electric field, and the fifth voltage difference is operatively different from the sixth voltage difference.

In one embodiment, in the same frame, the intensity ratio of the first electric field to the second electric field, the intensity ratio of the third electric field to the fourth electric field, and the intensity ratio of the fifth electric field to the sixth electric field are different from one another.

In one embodiment, the intensity ratio of the third electric field to the fourth electric field is between the intensity ratio of the first electric field to the second electric field and the intensity ratio of the fifth electric field to the sixth electric field.

For example, in the same frame, when the gray scale data of the blue light, the green light, and the red light are 128, 128, and 128 respectively, the first electric field applying component ET11-ET14, PL11, PL12 for example can enable the electrode ET11 and the electrode ET13 to have a voltage difference of 3.6 V, and enable the electrode ET12 and the electrode ET14 to have a voltage difference of 2.8 V, the second electric field applying component ET21-ET24, PL21, PL22 for example can enable the electrode ET21 and the electrode ET23 to have a voltage difference of 3.6 V, and enable the electrode ET22 and the electrode ET24 to have a voltage difference of 3.6 V, and the third electric field applying component ET31-ET34, PL31, PL32 for example can enable the electrode ET31 and the electrode ET33 to have a voltage difference of 3.6 V, and enable the electrode ET32 and the electrode ET34 to have a voltage difference of 4.2 V.

Through the aforementioned operations, voltage/transmittance curves (also referred to as gamma curves) of lights of different colors (including blue, green, and red) are generally superposed with each other (referring to FIG. 2B). In this way, the complexity in controlling the light to pass through the liquid crystal display medium may be decreased, and the generation of the color shift under a high voltage may be avoided.

It should be noted that, in various embodiments, the intensity of the third electric field may be different from that of the fourth electric field, and thus the present disclosure is not limited to the embodiment where the intensity of the above third electric field is the same as that of the fourth electric field.

Figure 5:
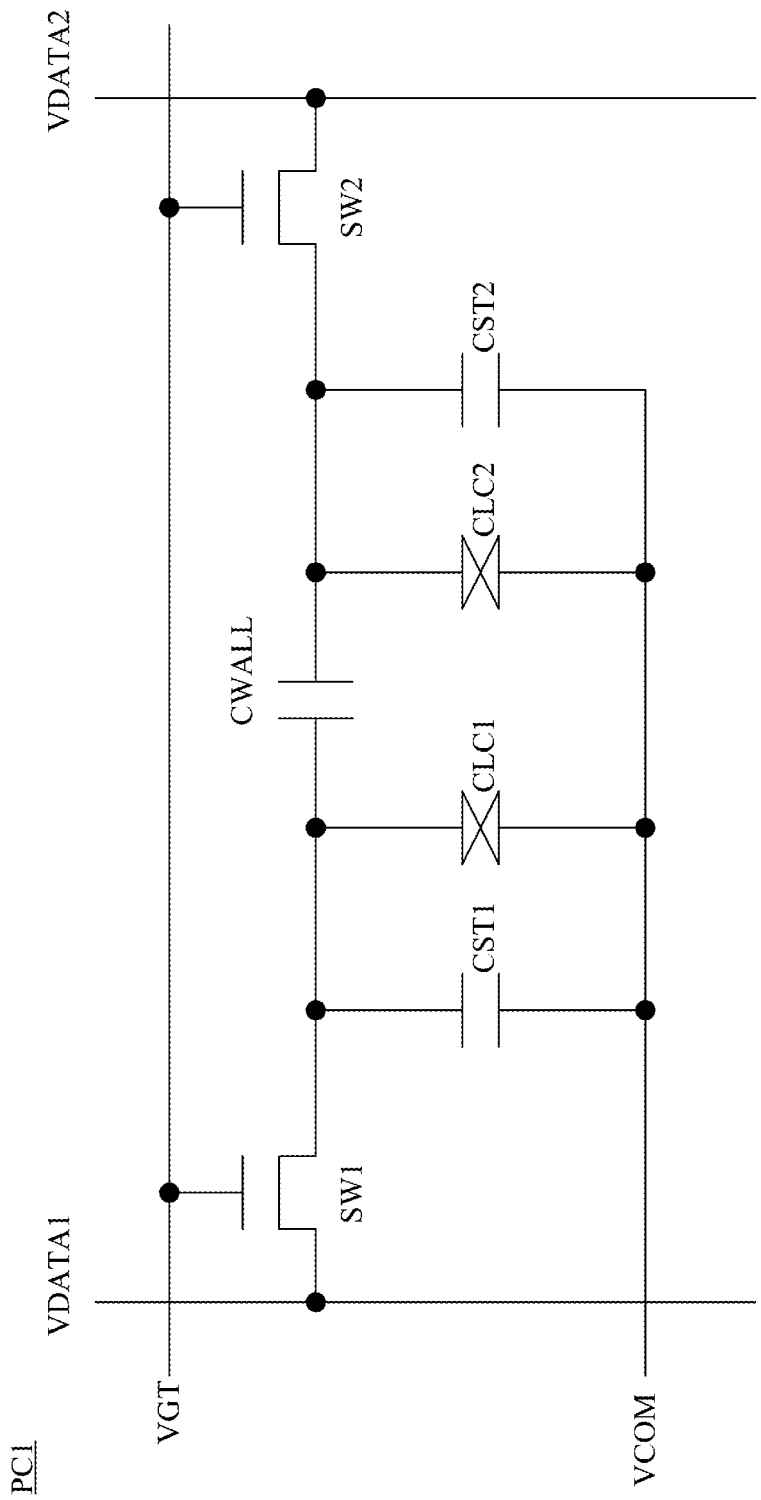
FIG. 5 is a circuit diagram of a pixel circuit of a display device according to one embodiment of the present disclosure.

Hereinafter, details of one embodiment of the present disclosure are illustrated in connection with FIG. 1 and FIG. 5, but the present disclosure is not limited thereto. In one embodiment, the display device 100 may provide a data voltage VDATA1 to the electrode ET1, provide a data voltage VDATA2 to the electrode ET2, and provide a common voltage VCOM to the electrodes ET3 and ET4, thus enabling the electrodes ET3 and ET4 to become a common electrode. In this embodiment, the display device 100 has an equivalent pixel circuit PC1, wherein the capacitor of the electrode post PL1 is represented as a capacitor CWALL, and the liquid crystal display medium LC1, LC2 is respectively represented as liquid crystal components CLC1, CLC2.

In the present embodiment, the liquid crystal component CLC1 is coupled between a first end of the capacitor CWALL and the common electrode having the common voltage VCOM. The liquid crystal component CLC2 is coupled between a second end of the capacitor CWALL and the common electrode having the common voltage VCOM. A storage capacitor CST1 is coupled in parallel to the liquid crystal component CLC1. A storage capacitor CST2 is coupled in parallel to the liquid crystal component CLC2. A switch SW1 is coupled between the storage capacitor CST1 and a first data line, for providing the data voltage VDATA1 to the storage capacitor CST1. A switch SW2 is coupled between the storage capacitor CST2 and a second data line, for providing the data voltage VDATA2 to the storage capacitor CST2. Gate ends of the gate switches SW1 and SW2 are coupled to a gate line, for receiving a scan signal VGT.

Through the above configuration, the data voltages VDATA1-VDATA2 and the common voltage VCOM can be used to apply the electric fields of different intensities to different portions of the liquid crystal display medium LC1, LC2. In this way, the liquid crystal display medium LC1, LC2 can allow more refined operations thereof.

Figure 6:
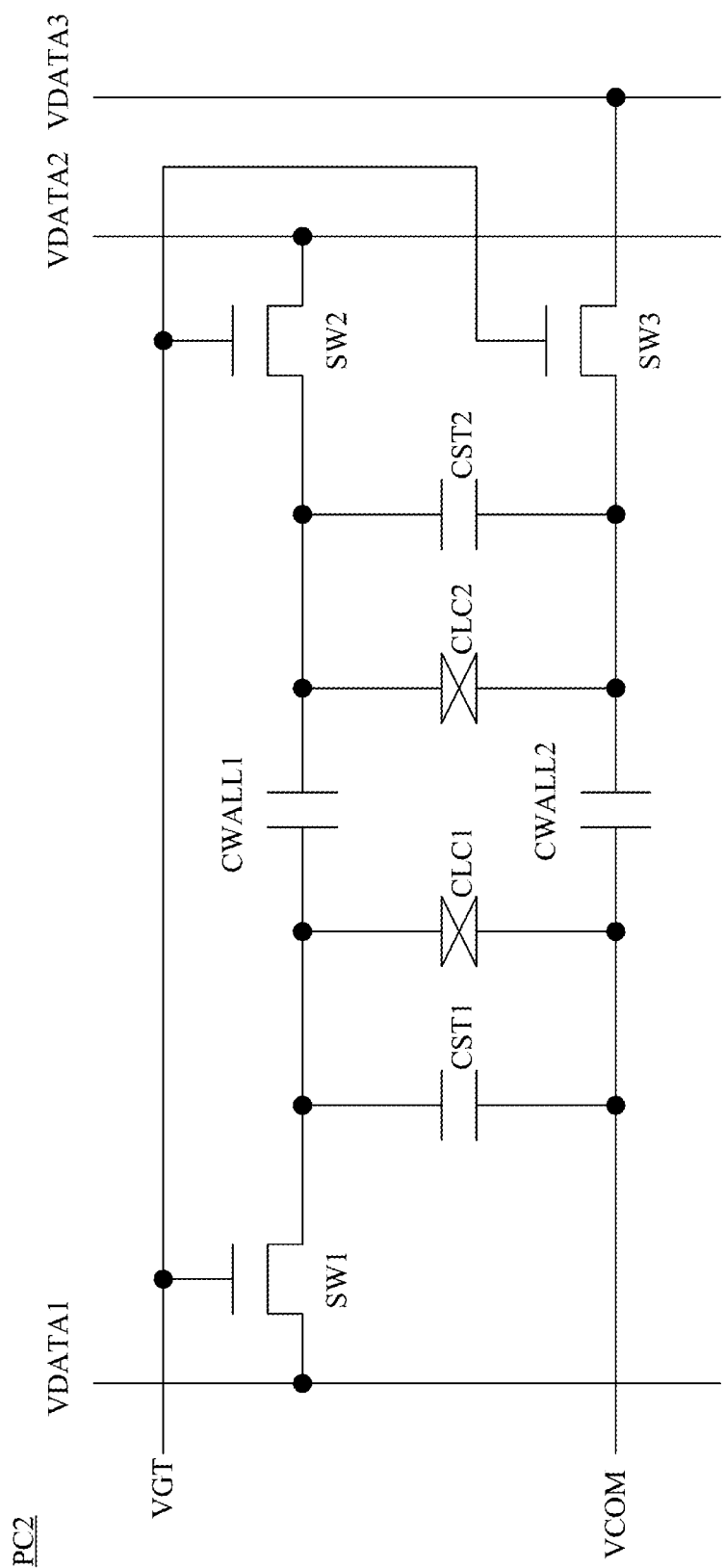
FIG. 6 is a circuit diagram of a pixel circuit of a display device according to one embodiment of the present disclosure.

Hereinafter, details of one embodiment of the present disclosure are illustrated in connection with FIG. 1 and FIG. 6, but the present disclosure is not limited thereto. In one embodiment, the display device 100 may provide a data voltage VDATA1 to the electrode ET1, provide a data voltage VDATA2 to the electrode ET2, provide a data voltage VDATA3 to the electrode ET4, and provide a common voltage VCOM to the electrode ET3. In this embodiment, the display device 100 has an equivalent pixel circuit PC2, wherein the capacitor of the electrode post PL1 is represented as a capacitor CWALL1, the capacitor of the electrode post PL2 is represented as a capacitor CWALL2, and the liquid crystal display medium LC1, LC2 is respectively represented as liquid crystal components CLC1, CLC2.

In the present embodiment, the liquid crystal component CLC1 is coupled between a first end of the capacitor CWALL1 and a first end of the capacitor CWALL2. The liquid crystal component CLC2 is coupled between a second end of the capacitor CWALL1 and a second end of the capacitor CWALL2. A storage capacitor CST1 is coupled in parallel to the liquid crystal component CLC1. A storage capacitor CST2 is coupled in parallel to the liquid crystal component CLC2. A switch SW1 is coupled between the storage capacitor CST1 and a first data line, for providing the data voltage VDATA1 to the storage capacitor CST1. A switch SW2 is coupled between a first end of the storage capacitor CST2 and a second data line, for providing the data voltage VDATA2 to the first end of the storage capacitor CST2. A switch SW3 is coupled between a second end of the storage capacitor CST2 and a third data line, for providing the data voltage VDATA3 to the second end of the storage capacitor CST2. The common electrode having the common voltage VCOM is electrically connected to the first end of the capacitor CWALL2. Gate ends of the gate switches SW1, SW2, and SW3 are coupled to a gate line, for receiving a scan signal VGT.

Through the above configuration, the data voltages VDATA1-VDATA3 and the common voltage VCOM can be used to apply the electric fields of different intensities to different portions of the liquid crystal display medium LC1, LC2. In this way, the liquid crystal display medium LC1, LC2 can allow more refined operations thereof.

Figure 7:
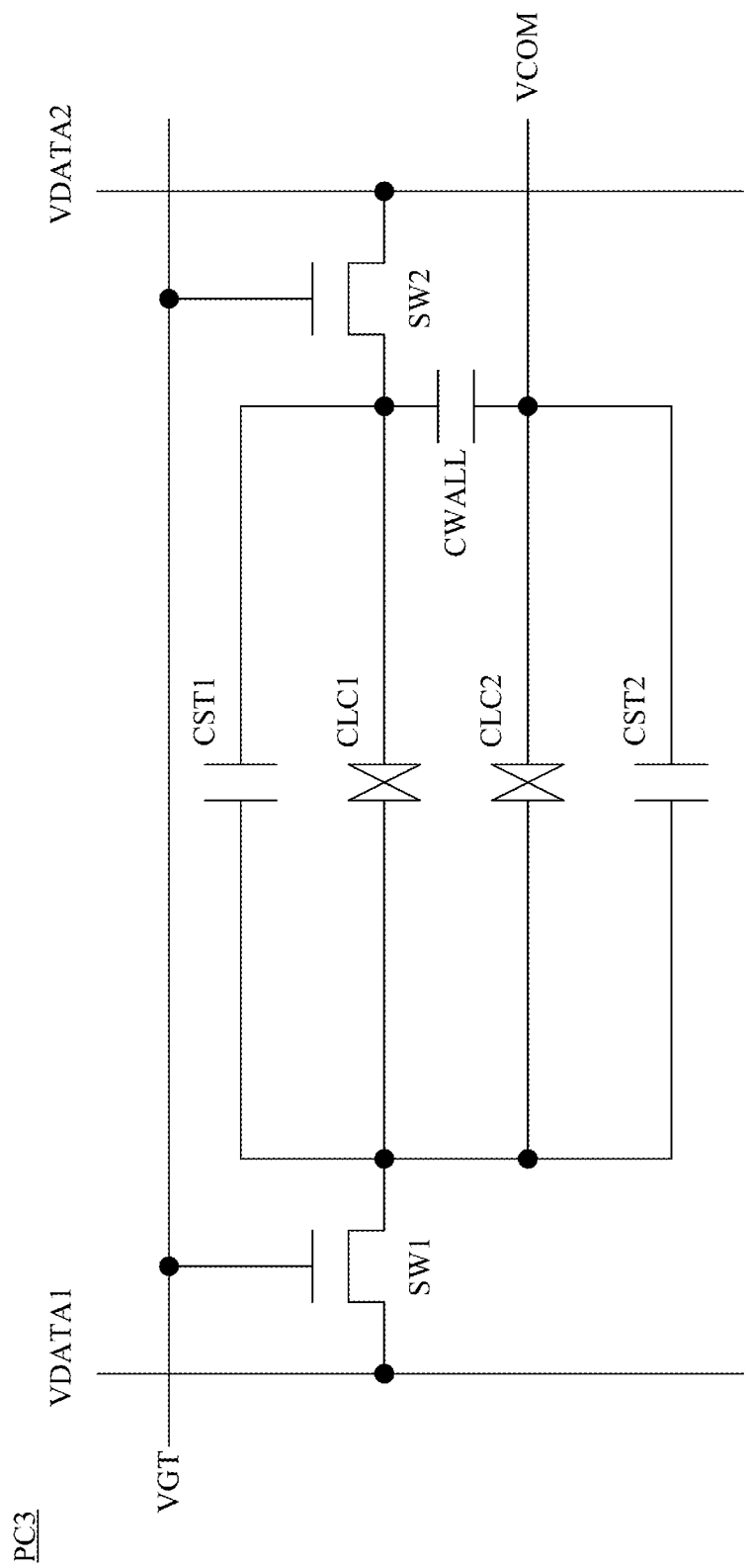
FIG. 7 is a circuit diagram of a pixel circuit of a display device according to one embodiment of the present disclosure.

Hereinafter, details of one embodiment of the present disclosure are illustrated in connection with FIG. 1 and FIG. 7, but the present disclosure is not limited thereto. In one embodiment, the display device 100 may provide a data voltage VDATA1 to the electrodes ET1 and ET2, provide a data voltage VDATA2 to the electrode ET3, and provide a common voltage VCOM to the electrode ET4. In this embodiment, the display device 100 has an equivalent pixel circuit PC3, wherein the capacitor of the electrode post PL2 is represented as a capacitor CWALL, and the liquid crystal display medium LC1, LC2 is respectively represented as liquid crystal components CLC1, CLC2.

In the present embodiment, a first end of the liquid crystal component CLC1 is coupled to a first end of the capacitor CWALL. A first end of the liquid crystal component CLC2 is coupled to a second end of the capacitor CWALL and the common electrode having the common voltage VCOM. A second end of the liquid crystal component CLC2 is coupled to a second end of the liquid crystal component CLC1. A storage capacitor CST1 is coupled in parallel to the liquid crystal component CLC1. A storage capacitor CST2 is coupled in parallel to the liquid crystal component CLC2. A switch SW1 is coupled between the second end of the liquid crystal component CLC1 and a first data line, for providing the data voltage VDATA1 to the second end of the liquid crystal component CLC1. A switch SW2 is coupled between the first end of the liquid crystal component CLC1 and a second data line, for providing the data voltage VDATA2 to the first end of the liquid crystal component CLC1. Gate ends of the gate switches SW1 and SW2 are coupled to a gate line, for receiving a scan signal VGT.

Through the above configuration, the data voltages VDATA1-VDATA2 and the common voltage VCOM can be used to apply the electric fields of different intensities to different portions of the liquid crystal display medium LC1, LC2. In this way, the liquid crystal display medium LC1, LC2 can allow more refined operations thereof.

Figure 8:
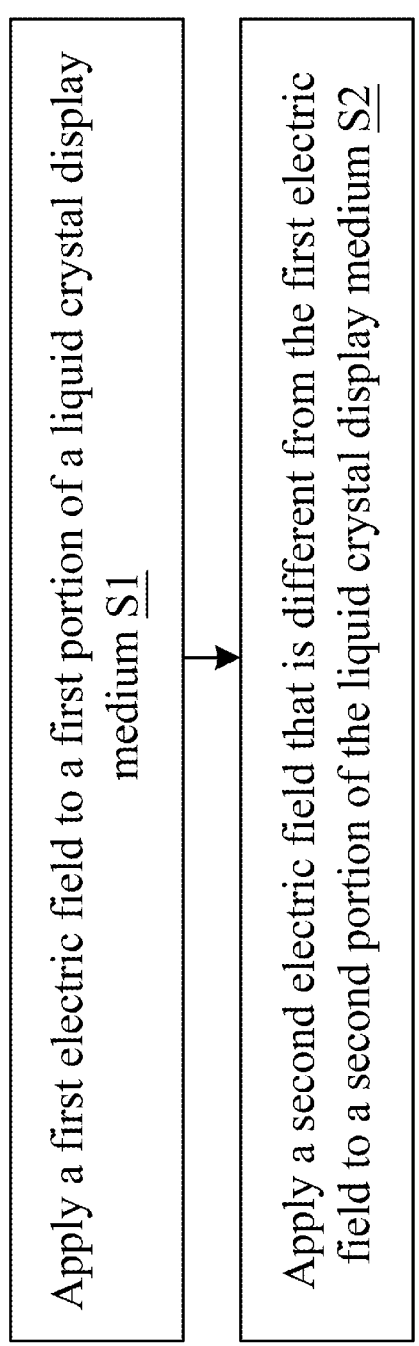
FIG. 8 is a flow chart of an operating method of a display device according to one embodiment of the present disclosure.

FIG. 8 is a flow chart of an operating method 200 of a display device according to one embodiment of the present disclosure.

It should be noted that, the operating method 200 of a display device can be applied to a display device having a structure the same as or similar to that in FIG. 1. For simplicity of description, the display device 100 in FIG. 1 is taken as an example below to describe the operating method 200 of a display device according to one embodiment of the present disclosure, but the present disclosure is not limited thereto.

In addition, it should be understood that, the order of the steps of the operating method 200 of a display device mentioned in the present embodiment can all be adjusted according to actual requirements, or even can be implemented fully or partially simultaneously, unless otherwise indicated.

Furthermore, in various embodiments, these steps can also be adaptively added, replaced, and/or omitted.

In the present embodiment, the operating method 200 of a display device includes the following steps.

In Step S1, the electric field applying component applies a first electric field to the liquid crystal display medium LC1.

In Step S2, the electric field applying component applies a second electric field to the liquid crystal display medium LC2, wherein the first electric field and the second electric field are parallel to the first substrate SUB1, and the intensity of the first electric field is operatively different from that of the second electric field.

It should be noted that, specific details of the above steps may refer to the above-mentioned paragraphs, thus the detailed will not be repeated herein.

Through the above operations, different portions of the liquid crystal display medium LC1, LC2 can allow more refined operations thereof, improving the displaying quality of the display device 100.

Figure 9:
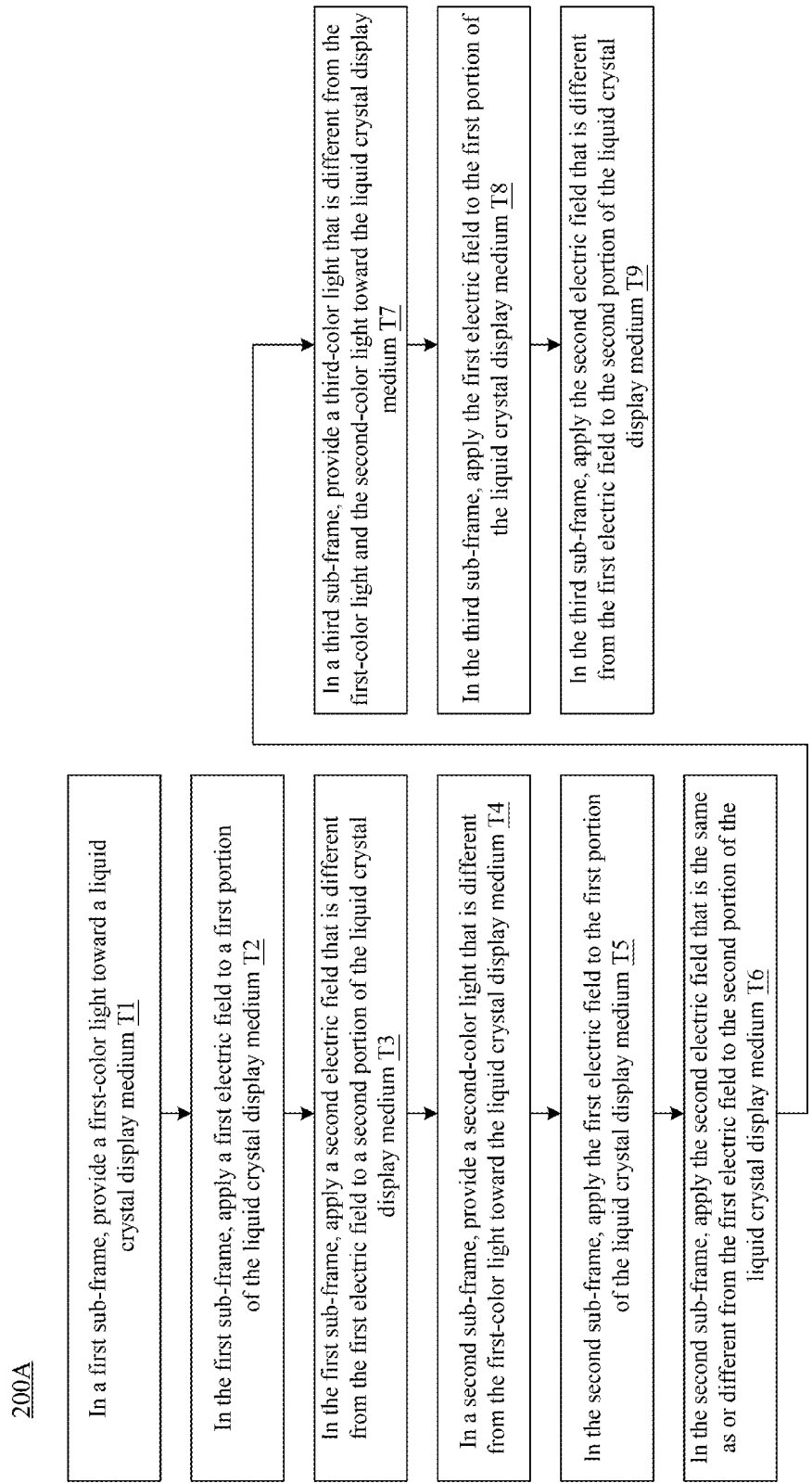
FIG. 9 is a flow chart of an operating method of a display device according to one embodiment of the present disclosure.

FIG. 9 is a flow chart of an operating method 200A of a display device according to one embodiment of the present disclosure.

Figure 3:
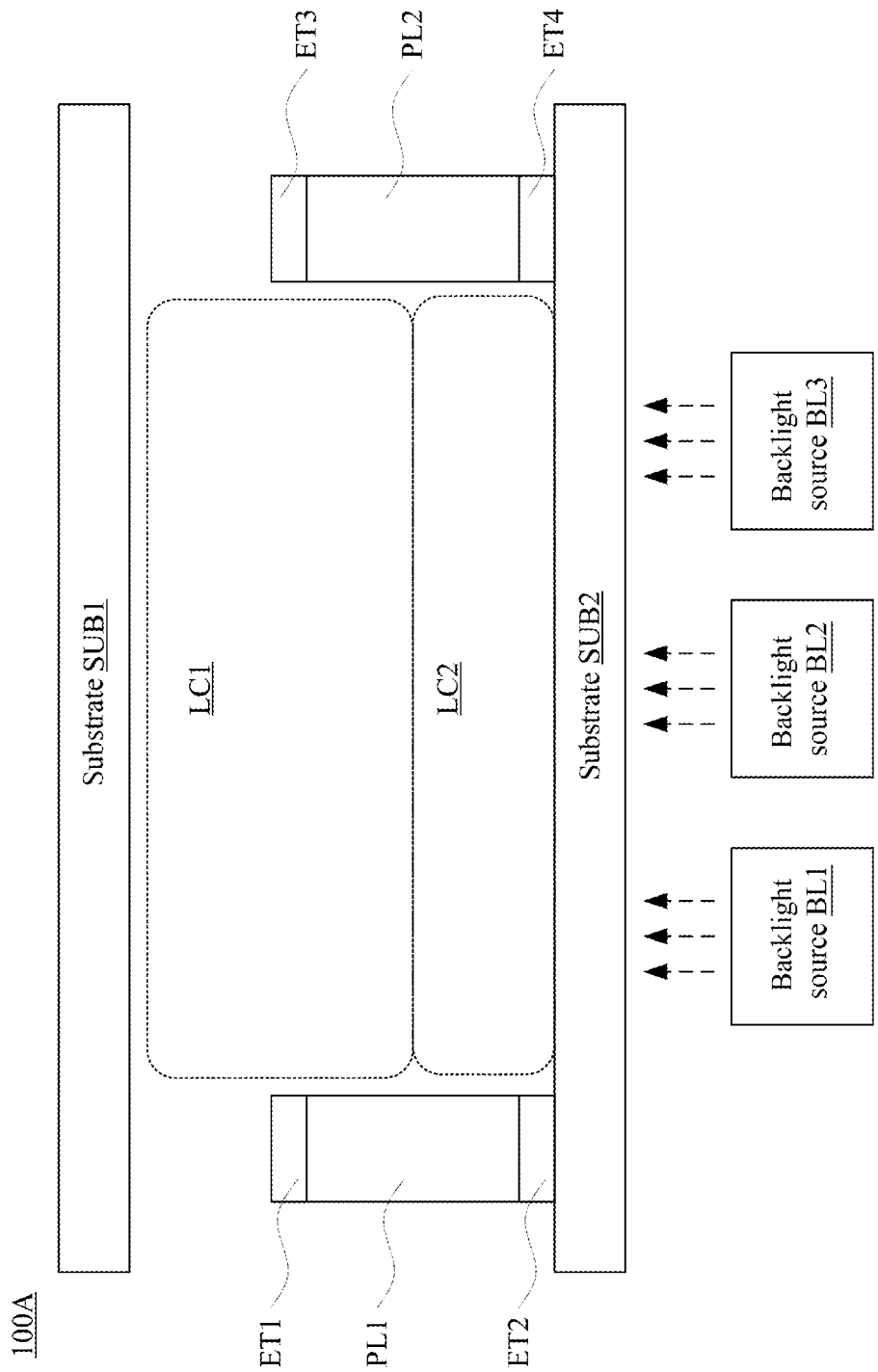
FIG. 3 is a schematic view of a display device according to one embodiment of the present disclosure.

It should be noted that, the operating method 200A of a display device can be applied to a display device having a structure the same as or similar to that in FIG. 3. For simplicity of description, the display device 100A in FIG. 3 is taken as an example below to describe the operating method 200A of a display device according to one embodiment of the present disclosure, but the present disclosure is not limited thereto.

In addition, it should be understood that, the order of the steps of the operating method 200A of a display device mentioned in the present embodiment can all be adjusted according to actual requirements, or even can be implemented fully or partially simultaneously, unless otherwise indicated.

Furthermore, in various embodiments, these steps can also be adaptively added, replaced, and/or omitted.

In the present embodiment, the operating method 200A of a display device includes the following steps.

In Step T1, in a first sub-frame, the first backlight source BL1 is configured to provide a first-color light to the liquid crystal display medium LC1, LC2.

In Step T2, in the first sub-frame, the electric field applying component ET1-ET4, PL1, PL2 applies a first electric field to the liquid crystal display medium LC1.

In Step T3, in the first sub-frame, the electric field applying component ET1-ET4, PL1, PL2 applies a second electric field that is different from the first electric field to the liquid crystal display medium LC2.

In Step T4, in a second sub-frame, the second backlight source BL2 is configured to provide a second-color light that is different from the first-color light to the liquid crystal display medium LC1, LC2.

In Step T5, in the second sub-frame, the electric field applying component ET1-ET4, PL1, PL2 applies the first electric field to the liquid crystal display medium LC1.

In Step T6, in the second sub-frame, the electric field applying component ET1-ET4, PL1, PL2 applies the second electric field that is the same as or different from the first electric field to the liquid crystal display medium LC2.

In Step T7, in a third sub-frame, the third backlight source BL3 is configured to provide a third-color light that is different from the first-color light and the second-color light to the liquid crystal display medium LC1, LC2.

In Step T8, in the third sub-frame, the electric field applying component ET1-ET4, PL1, PL2 applies the first electric field to the liquid crystal display medium LC1.

In Step T9, in the third sub-frame, the electric field applying component ET1-ET4, PL1, PL2 applies the second electric field that is different from the first electric field to the liquid crystal display medium LC2.

It should be noted that, specific details of the above steps can refer to the above-mentioned paragraphs, thus the details will not be repeated herein.

Through the above operations, different portions of the liquid crystal display medium LC1, LC2 can allow more refined operations thereof, improving the displaying quality of the display device 100A.

Figure 10:
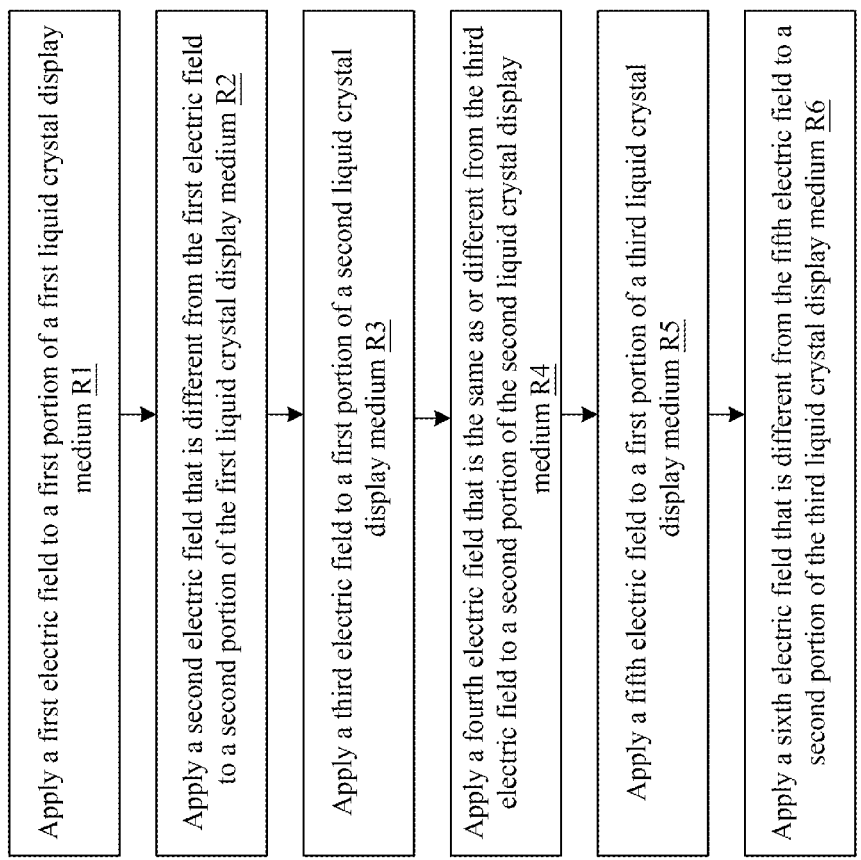
FIG. 10 is a flow chart of an operating method of a display device according to one embodiment of the present disclosure.

FIG. 10 is a flow chart of an operating method 200B of a display device according to one embodiment of the present disclosure.

Figure 4:
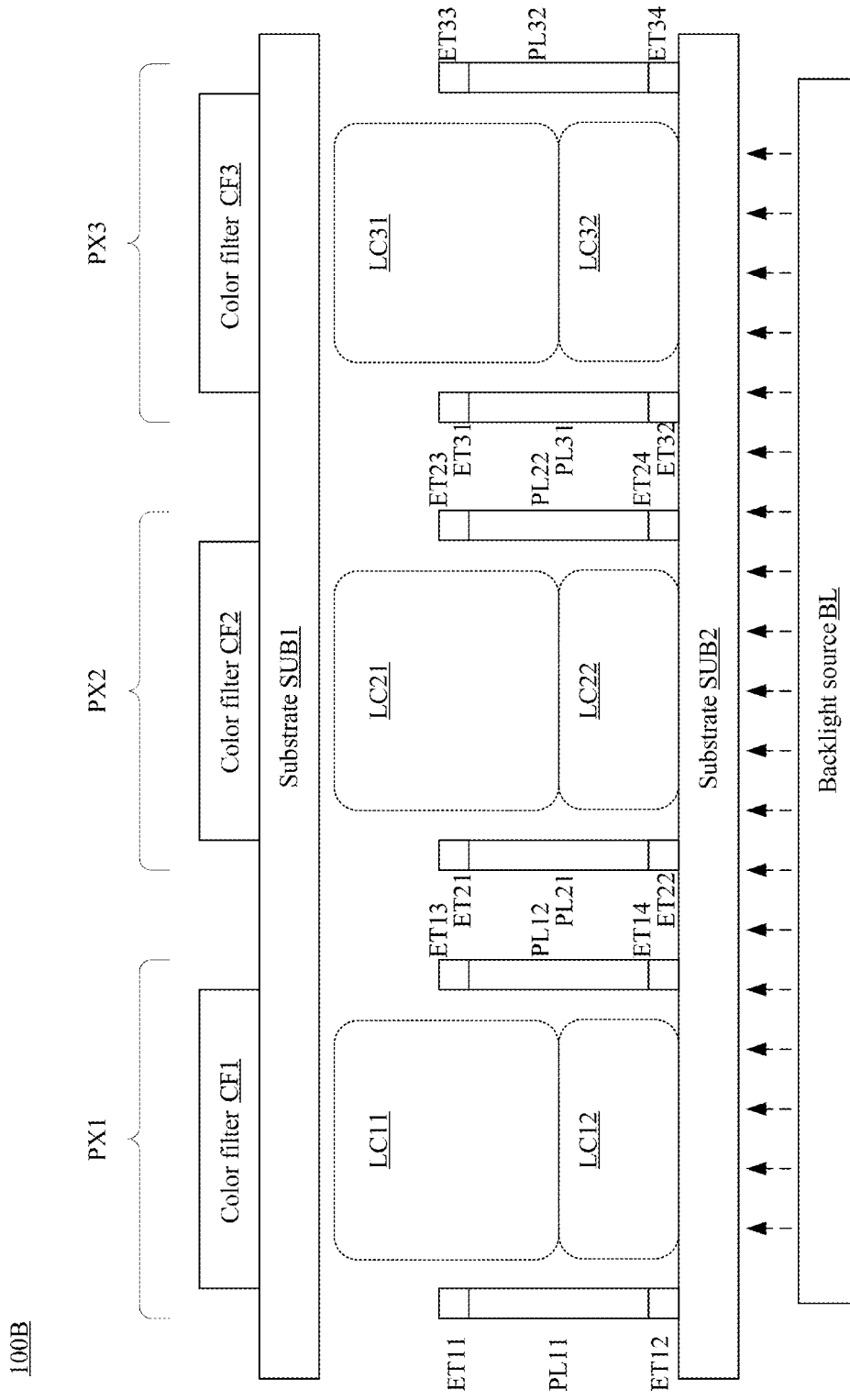
FIG. 4 is a schematic view of a display device according to one embodiment of the present disclosure.

It should be noted that, the operating method 200B of a display device can be applied to a display device having a structure the same as or similar to that in FIG. 4. For simplicity of description, the display device 100B in FIG. 4 is taken as an example below to describe the operating method 200B of a display device according to one embodiment of the present disclosure, but the present disclosure is not limited thereto.

In addition, it should be understood that, the order of the steps of the operating method 200B of a display device mentioned in the present embodiment can all be adjusted according to actual requirements, or even can be implemented fully or partially simultaneously, unless otherwise indicated.

Furthermore, in various embodiments, these steps can also be adaptively added, replaced, and/or omitted.

In the present embodiment, the operating method 200B of a display device includes the following steps.

In Step R1, the first electric field applying component ET11-ET14, PL11, PL12 applies a first electric field to the first portion LC11 of the first liquid crystal display medium.

In Step R2, the first electric field applying component ET11-ET14, PL11, PL12 applies a second electric field that is different from the first electric field to the second portion LC12 of the first liquid crystal display medium.

In Step R3, the second electric field applying component ET21-ET24, PL21, PL22 applies a third electric field to the first portion LC21 of the second liquid crystal display medium.

In Step R4, the second electric field applying component ET21-ET24, PL21, PL22 applies a fourth electric field that is the same as or different from the third electric field to the second portion LC22 of the second liquid crystal display medium.

In Step R5, the third electric field applying component ET31-ET34, PL31, PL32 applies a fifth electric field to the first portion LC31 of the third liquid crystal display medium.

In Step R6, the third electric field applying component ET31-ET34, PL31, PL32 applies a sixth electric field that is different from the fifth electric field to the second portion LC32 of the third liquid crystal display medium.

It should be noted that, specific details of the above steps can refer to the above-mentioned paragraphs, thus the details will not be repeated herein.

Through the aforementioned operations, voltage/transmittance curves of lights of different colors (such as blue light, green light, and red light) are generally superposed with each other (referring to FIG. 2B). In this way, the complexity in controlling the light to pass through the liquid crystal display medium may be decreased, and the generation of the color shift under a high voltage may be avoided.

Even though the present disclosure has been disclosed in the above-mentioned embodiments, it is not limited thereto. Any person of ordinary skill in the art may make various changes and modifications without departing from the spirit and scope of the present disclosure. Therefore, the scope of the present disclosure is defined by the appended claims.

What is claimed is:

1. An operating method of a display device, comprising:
    applying a first electric field to a first portion of a first liquid crystal display medium, wherein the first liquid crystal display medium is disposed between a first substrate and a second substrate; and
    applying a second electric field to a second portion of the first liquid crystal display medium;
    wherein, the first electric field and the second electric field are parallel to the first substrate, and the intensity of the first electric field is operatively different from that of the second electric field;
    providing a first-color light toward the first liquid crystal display medium in a first sub-liquid crystal display medium in a first sub-frame, wherein the first electric field and the second electric field have different intensities in the first sub-frame; and
    providing a second-color light toward the first liquid crystal display medium in a second sub-frame, wherein the first electric field and the second electric field provided by an electric field applying component have a same intensity in a second sub-frame.

2. The operating method of claim 1, further comprising:

applying a third electric field to a first portion of a second liquid crystal display medium, wherein the second liquid crystal display medium is disposed between the first substrate and the second substrate; and applying a fourth electric field to a second portion of the second liquid crystal display medium;

wherein, the third electric field and the fourth electric field are parallel to the first substrate, and an intensity ratio of the first electric field to the second electric field is different from an intensity ratio of the third electric field to the fourth electric field.

3. The operating method of claim 2, wherein the third electric field and the fourth electric field have a same intensity.

4. The operating method of claim 1, wherein the first electric field and the second electric field are concurrently and simultaneously generated.

5. The operating method of claim 1, wherein the first electric field and the second electric field are for a first pixel.

\* \* \* \* \*